(12) United States Patent
Durbin et al.

(10) Patent No.: US 7,782,877 B2
(45) Date of Patent: Aug. 24, 2010

(54) NETWORK-BASED DEDICATED BACKUP SERVICE

(75) Inventors: Mark R. Durbin, Richardson, TX (US); John W. Gantt, Rowlett, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1090 days.

(21) Appl. No.: 11/200,096

(22) Filed: Aug. 10, 2005

(65) Prior Publication Data
US 2006/0092955 A1    May 4, 2006

Related U.S. Application Data

(60) Provisional application No. 60/624,584, filed on Nov. 3, 2004.

(51) Int. Cl.
- H04L 12/56    (2006.01)
- H04L 12/66    (2006.01)
- H04L 12/26    (2006.01)
- H04J 3/16     (2006.01)

(52) U.S. Cl. ............... 370/401; 370/466; 370/352; 370/242; 370/219

(58) Field of Classification Search ........ 370/225, 370/217–221, 227–228, 401, 466, 352–356, 370/242, 226–28; 709/239
See application file for complete search history.

(56) References Cited

U.S. PATENT DOCUMENTS

| | | | |
|---|---|---|---|
| 6,311,288 B1 * | 10/2001 | Heeren et al. ............... 714/4 |
| 6,490,252 B1 * | 12/2002 | Riggan et al. ............... 370/237 |
| 6,693,878 B1 * | 2/2004 | Daruwalla et al. .......... 370/235 |
| 6,765,881 B1 * | 7/2004 | Rajakarunanayake ....... 370/256 |
| 7,249,276 B2 * | 7/2007 | Meese ........................... 714/4 |
| 7,269,132 B1 * | 9/2007 | Casey et al. ................. 370/219 |
| 7,353,293 B2 * | 4/2008 | Hipfinger .................... 709/239 |
| 7,382,767 B2 * | 6/2008 | Stumer ........................ 370/352 |
| 7,613,170 B1 * | 11/2009 | Grabelsky et al. ........... 370/352 |
| 7,619,966 B2 * | 11/2009 | Lee ............................. 370/218 |
| 2002/0146011 A1 * | 10/2002 | Stern ........................ 370/395.2 |
| 2003/0088698 A1 * | 5/2003 | Singh et al. ................. 709/239 |
| 2003/0110288 A1 * | 6/2003 | Ramanujan et al. ......... 709/238 |
| 2003/0189898 A1 * | 10/2003 | Frick et al. .................. 370/227 |
| 2004/0128201 A1 * | 7/2004 | Ofir et al. ...................... 705/17 |
| 2005/0097219 A1 * | 5/2005 | Goguen et al. .............. 709/238 |
| 2005/0172160 A1 * | 8/2005 | Taylor et al. ................... 714/4 |
| 2005/0193249 A1 * | 9/2005 | Poustchi et al. ............... 714/13 |
| 2006/0047851 A1 * | 3/2006 | Voit et al. .................... 709/239 |

* cited by examiner

*Primary Examiner*—Steven H Nguyen
*Assistant Examiner*—Candal Elpenord

(57) ABSTRACT

A system and method for providing alternate dedicated connections are described. A primary dedicated connection may be configured to connect a first network and a second network, and a second dedicated network-based connection, which may include a point-to-point protocol (PPP)/layer 2 tunneling protocol (L2TP) tunnel, may be configured to automatically connect the first network and the second network when the primary dedicated connection fails.

12 Claims, 4 Drawing Sheets

NETWORK-BASED DEDICATED BACKUP SERVICE

RELATED APPLICATION

The present application claims priority under 35 U.S.C. §119 to U.S. Provisional Patent Application No. 60/624,584 filed on Nov. 3, 2004, which is incorporated in its entirety herein by reference.

FIELD OF THE INVENTION

Implementations consistent with the principles of the invention relate generally to communications networks and, more particularly, to systems and methods for providing backup network services.

BACKGROUND OF THE INVENTION

Private network infrastructures using frame relay, private Internet protocol (PIP), asynchronous transfer mode (ATM), IP virtual private network (VPN), and the like, are domains for the secure and efficient transmission of data among end-users. Typically, access to the private network resources by end-users at one or more remote sites is provided via dedicated circuits, e.g., leased lines from a carrier. Currently, failure of the dedicated circuits may result in isolation of the affected remote site(s), thereby disabling interconnectivity to other network devices. In addition, because typical dial-up secondary circuits use dynamic IP addressing in establishing a backup link to remote sites, such circuits do not support full bidirectional routing of a network (i.e., networked end-users) via the backup link.

SUMMARY OF THE INVENTION

According to one aspect, a system may include at least one logic device configured to provide a backup connection to a primary connection when the primary connection is unavailable, wherein the primary and backup connections are to connect first and second networks via a provider network, and wherein the backup connection includes a point-to-point protocol (PPP)/layer 2 tunneling protocol (L2TP) tunnel.

According to another aspect, a method may include enabling, via a first link including a provider network, communications between a first network and a user device associated with a second network, and enabling the communications via a second link including the provider network and a dedicated PPP/L2TP tunnel, when the first link is unavailable.

According to yet another aspect, a system may include means for providing a first dedicated PPP/L2TP tunnel linking a first network and a second network via a provider network; means for providing a second dedicated PPP/L2TP tunnel linking the first network and a third network via the provider network; and means for establishing a virtual private routing network (VPRN) associated with the first and second dedicated PPP/L2TP tunnels.

According to yet another aspect, a method may include connecting a first L2TP access concentrator (LAC) and an L2TP network server (LNS) via a first PPP/L2TP tunnel connecting a second LAC and the LNS using PPP/L2TP via a second PPP/L2TP tunnel; and managing, by the LNS, a first VPRN associated with the first PPP/L2TP tunnel, and a second VPRN associated with the second PPP/L2TP tunnel.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may provide a primary connection and a network-based backup connection on a path-diverse network. The backup connection may include a dedicated point-to-point protocol (PPP)/layer 2 tunneling protocol (L2TP) tunnel via a public network. In one exemplary implementation, when the primary connection becomes unavailable to carry internetwork transmissions, transmissions can be diverted to the dedicated PPP/L2TP tunnel.

Exemplary Network

Figure 1:
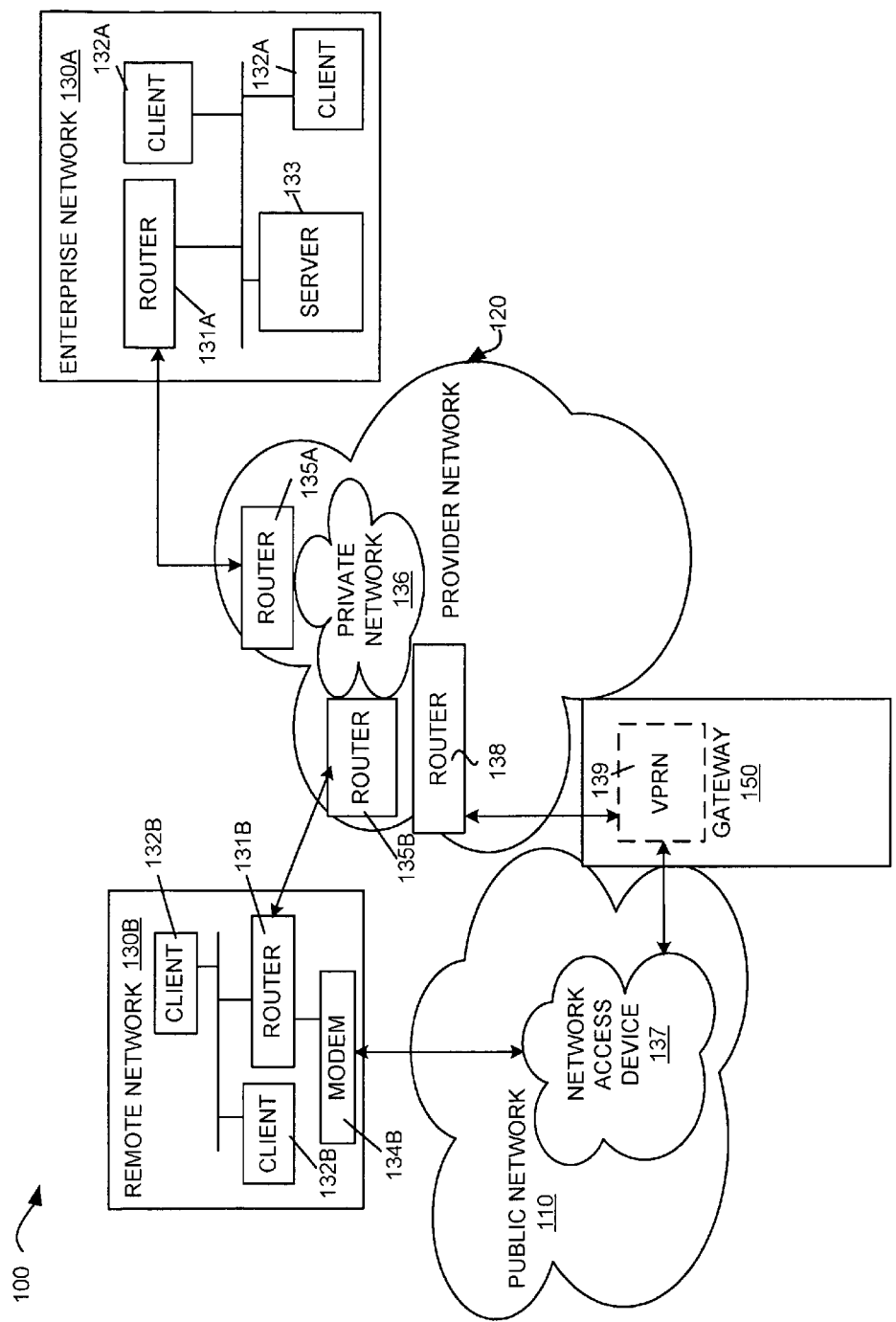
FIG. 1 is an exemplary diagram illustrating an exemplary network in which methods and systems consistent with the principles of the invention can be implemented.

FIG. 1 illustrates a communications network 100 in which systems and methods consistent with the principles of the invention may be implemented. As illustrated, communications network 100 includes an enterprise network 130A that may operatively communicate with remote network 130B. Communications network 100 may also include public network 110 and provider network 120 that may operatively connect to enterprise network 130A and remote network 130B. Provider network 120 may include a private network 136 that may be associated with enterprise network 130A and remote network 130B. Communications network 100 may also include a gateway 150 that may operatively connect to public network 110 and provider network 120. Gateway 150 includes virtual private routed network (VPRN) 139 that may be associated with enterprise network 130A, remote network 130B, and/or private network 136. Communications network 100 may include the various illustrated network devices, such as clients, routers, modems, servers, and/or network access devices, and other devices (not shown) that facilitate communications between the various network devices.

In one implementation, any one or more of the network and/or network devices may be linked, as shown, via any well-known technique, such as wired, wireless, and/or optical communication links. The links may include, for example, a broadband connection, such as a digital subscriber line (DSL) connection provided over, for example, shielded twisted pair, a cable modem connection provided over, for example, coaxial cable and/or optical fiber, and/or a wireless connection.

The number and type of devices illustrated in FIG. 1 are provided for simplicity. In practice, a typical network in which the invention may be implemented could include more or fewer networks and/or devices that aid in receiving, processing, and/or transmitting data, than what is illustrated in FIG. 1. In addition, devices depicted as single entities may be implemented in a distributed arrangement. Further, in some implementations, functions described as being performed by two or more devices may be performed by a single device.

In one implementation consistent with principles of the invention, public network 110, provider network 120, enterprise network 130A, remote network 130B, and/or private network 136 may include a local area network (LAN), a wide area network (WAN), a public switched telephone network (PSTN), a dial access network (DAN), an intranet, the Internet, or a combination of similar or dissimilar networks. According to one implementation, provider network 120 and/or private network 136 may include a frame relay network, a private Internet protocol (PIP) network, an asynchronous transfer mode (ATM) network, an IP virtual private network (VPN) network, or any combination thereof.

According to one implementation, public network 110, provider network 120, enterprise network 130A, remote network 130B, and/or private network 136 may include one or more network devices, such as a network access device 137, routers 131A and 131B (collectively, routers 131), 135A and 135B (collectively, routers 135), and 138, modem 134B, server 133, clients 132A and 132B, (collectively, clients 132), and/or other systems/devices cooperatively operating to receive, send, and/or transport data or other media.

In one implementation consistent with principles of the invention, clients 132 may include any client or user device capable of interacting with networked devices via a unique network identifier, such as a network address, for example. Clients 132 may include one or more devices, such as a personal computer, a laptop, a personal digital assistant (PDA), or another type of computation or communication device capable of initiating, processing, transmitting, and/or receiving data (e.g., data packets) and/or voice communications or other media via public network 110 and/or provider network 120. According to one implementation, clients 132B may be associated with a remote user of enterprise network 130A. According to one implementation, clients 132B may be operated by a user to gain access to private network 136 via router 131B using a link to router 135B, or via public network 10 via router 131B using modem 134B and network access device 137 and then through gateway 150 and a link to router 138. Modem 134B may include any modulator-demodulator device that may convert digital and analog transmissions used to receive and/or send communications.

In one implementation consistent with principles of the invention, routers 131, 135, and 138 may include any network devices that may receive data packets, process the data packets to determine the intended destination(s), and/or forward the data packets toward the determined destination(s), which may be configured, for example, as an edge router, a broadband interface, a switch, a proxy router and the like. In one implementation, router 131B may be configured to monitor the link to router 135B for availability/unavailability. Router 131B may be configured to route data transmissions from clients 132B to modem 134B when it is determined that the link via router 135B is unavailable. According to one implementation, router 131B may be configured to communicate with gateway 150 via a PPP connection.

In one implementation consistent with principles of the invention, network access device 137 may include one or more devices that provide clients 132B with access to public network 110. For example, network access device 137 may include a router, a network switch, a network access server (NAS), a DAN, a firewall, a database, a gateway, a server, a network operations center (NOC), a network address translation (NAT), an authentication authority, etc. According to one implementation, network access device 137 may be configured to function as an L2TP access concentrator (LAC) and communicate with other devices via a PPP/L2TP tunnel, for example.

In one implementation consistent with principles of the invention, server 133 may include any device and/or program that may manage network resources. According to one implementation, server 133 may authenticate clients 132B to access private network 136 and/or enterprise network 130A.

In one implementation consistent with principles of the invention, gateway 150 may include any device that may connect two or more networks, for example, a Shasta Broadband Service Node (BSN) commercially available from Nortel Networks. According to one implementation, gateway 150 may be configured to store network addresses associated with remote network 130B. In one implementation, gateway 150 may be configured to establish VPRN 139. In one implementation, gateway 150 may be configured to function as an L2TP network server (LNS) and act as a virtual interface to communicate, for example, via a PPP/L2TP tunnel. In one implementation, gateway 150 may be configured to advertise routing information regarding the availability of the PPP/L2TP tunnel, for example, using the routing information protocol (RIP).

In one implementation consistent with principles of the invention, private network 136 may include any pathway through a switched network, which is or functions as a dedicated, physically connected circuit. According to one implementation, private network 136 may be a fixed circuit that is predefined to be associated with enterprise network 130A, for example, by an entity associated with provider network 120. According to one implementation, private network 136 may include a VPN routing/forwarding (VRF) instance, for example, where provider network 120 is a PIP. In one implementation, the VRF may include routing information associated with private network 136. For example, the VRF may include an IP routing table, a derived forwarding table, a group of interfaces that use the forwarding table, and processes and routing protocols that determine what to include in the forwarding table.

In communications network 100 exemplified in FIG. 1, data may be communicated between client 132B and client 132A via at least two possible connections. The first depicted connection may be from client 132B through router 131B, router 135B, private network 136, router 135A, and router 131A to client 132A. The second depicted connection may be from client 132B through router 131B, modem 134B, network access device 137, VPRN 139, router 138, private network 136, router 135A, and router 131A to client 132A. Accordingly, at least two path-diverse connections may exist for data transmission between client 132B and client 132A. In one implementation, the first connection may be a higher priority connection (i.e., a primary connection).

Figure 2:
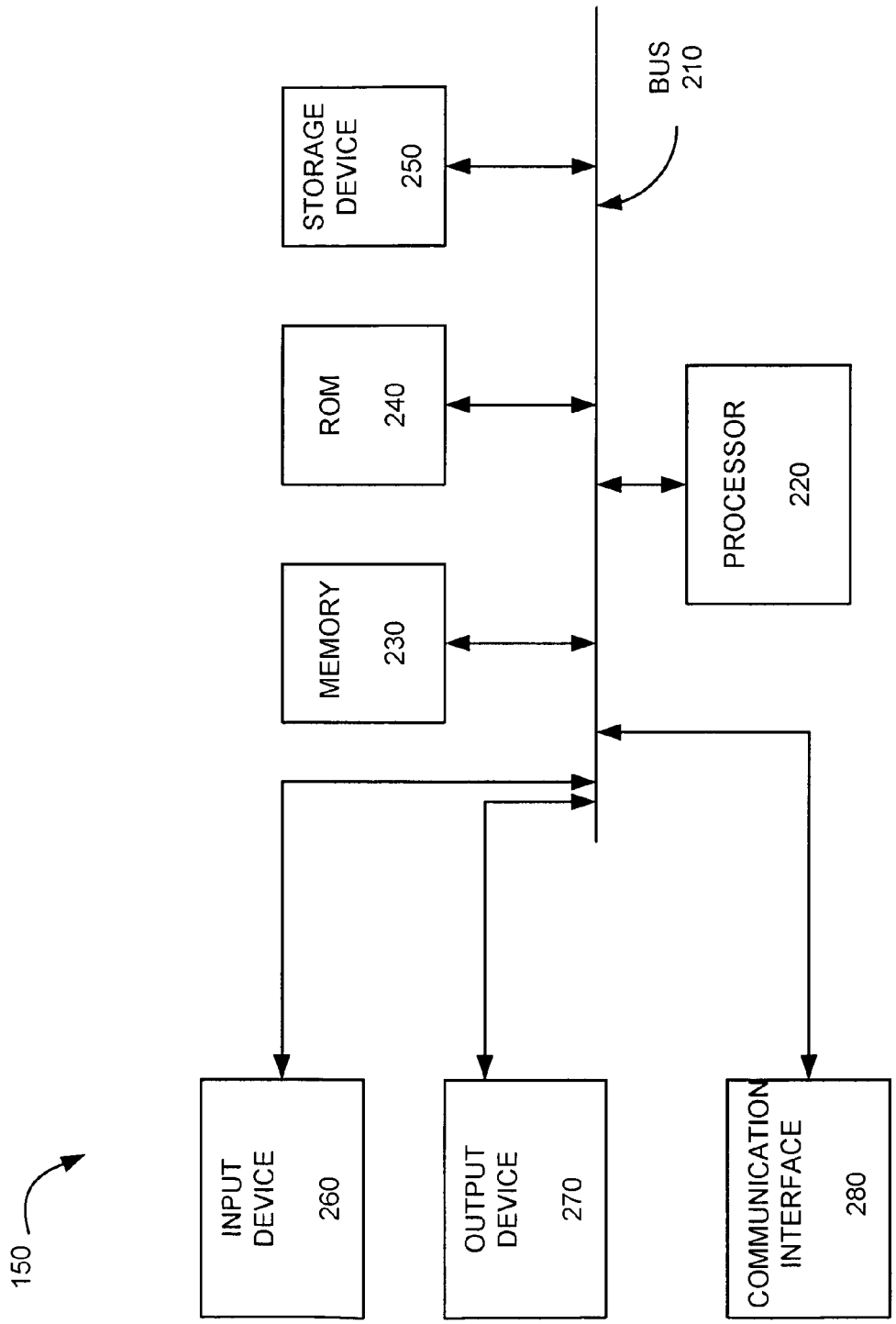
FIG. 2 is an exemplary block diagram of the gateway of FIG. 1 according to an implementation consistent with the principles of the invention.

FIG. 2 illustrates an exemplary configuration of gateway 150 in an implementation consistent with the principles of the invention. Other configurations may alternatively be used. Clients 132, network access device 137, routers 131, modem 134B, and/or server 133 may be similarly configured. As illustrated, gateway 150 may include a bus 210, a processor 220, a memory 230, a read only memory (ROM) 240, a storage device 250, an input device 260, an output device 270, and a communication interface 280. Bus 210 permits communication among the components of gateway 150.

Processor 220 may include any type of conventional processor, microprocessor, or processing logic that interprets and executes instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a conventional ROM device and/or another type of static storage device that may store static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to gateway 150, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables gateway 150 to communicate with other devices and/or systems. For example, communication interface 280 may include a modem or an Ethernet interface to a LAN. Alternatively, communication interface 280 may include other mechanisms for communicating via a network. In alternative implementations, gateway 150 and on or more of the other devices (e.g., network access device 137, routers 131, etc.), may be implemented in hardwired logic.

Exemplary Processing

In one implementation consistent with the principles of the invention, a peer address may be assigned to an interface of router 131B which connects to modem 134B, and a local address may be assigned to a logical or virtual interface of VPRN 139 of gateway 150, using a dedicated PPP/L2TP connection. The peer address and the local address may be provided to and/or stored in gateway 150. Additionally, an address associated with remote network 130B may be provided to and/or stored in gateway 150, and associated with the virtual interface. The peer address, the local address, and/or the network address may be static and/or unique per virtual interface. Remote network 130B may be assigned a username associated with the virtual interface, which includes a domain name associated with VPRN 139. According to one implementation, the virtual interface may remain inactive as long as the link between routers 131B and 135B is maintained.

Figure 3:
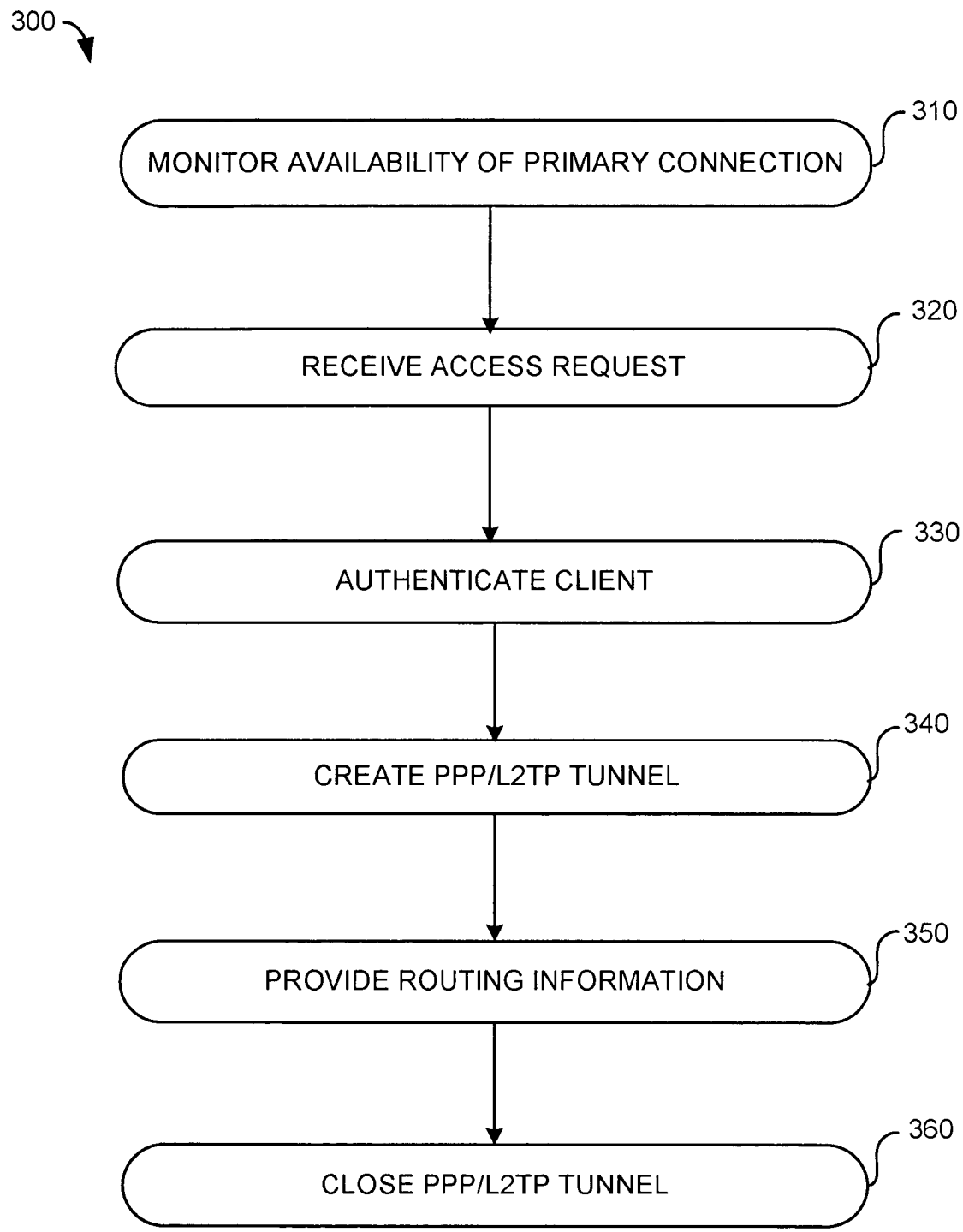
FIG. 3 is an exemplary flow diagram illustrating a method for providing alternative connectivity consistent with the principles of the invention.

FIG. 3 is a flowchart of exemplary processing 300 for selectively connecting remote network 130B via diverse connections to private network 136 and/or enterprise network 130A, according to an implementation consistent with principles of the invention. Upon configuration of gateway 150 to establish the dedicated PPP/L2TP tunnel connection, as discussed above, remote network 130B may automatically reconnect to private network 136 and/or enterprise network 130A when the link via router 135B becomes unavailable.

Router 131B may monitor the status of the connection to router 135B for availability (operation 310). According to one implementation, router 131B may verify the status of the connection at a periodic time interval, such as every second. The time interval may be configurable. When router 132B determines that the connection, in practice, is unavailable, router 132B may initiate a dial-up connection to network access device 137 via modem 134B (operation 320), for example, using PPP. The dial-up connection may include an access request that may include a username associated with network 130B. Network access device 137 may forward the access request to gateway 150, identifying VPRN 139 as being associated with the username. Gateway 150 may authenticate router 131B. In one implementation, gateway 150 may forward the access request to an authenticating authority, e.g., server 133, for authentication (operation 330).

Upon authentication, the virtual interface is activated, thereby creating a PPP/L2TP tunnel logically terminated by network access device 137, which functions as an LAC, and VPRN 139, which functions as an LNS (operation 340). In one implementation, a static connection is established between the peer address and the local address to effectively establish, for example, a serial port connection or a similar connection. Accordingly, the PPP/L2TP connection permits full bidirectional routing to/from client devices 132B.

Upon establishment of the virtual interface, VPRN 139 may "advertise" the availability of the PPP/L2TP connection by updating private network 136 via router 138 to redirect network traffic destined for remote network 130B via the PPP/L2TP (operation 350). In one implementation, routing information protocol (RIP) may be used to advertise the PPP/L2TP connection.

The PPP/L2TP connection may be maintained as long as desired. In one implementation, router 131B may determine when the availability of the link to router 135B returns. When the link between router 131B and router 135B becomes available, network traffic destined for network 130B may again be routed over that link. The PPP/L2TP connection may be ended, and the virtual interface (e.g., VPRN 139) made inactive (operation 360).

EXAMPLES

Figure 4:
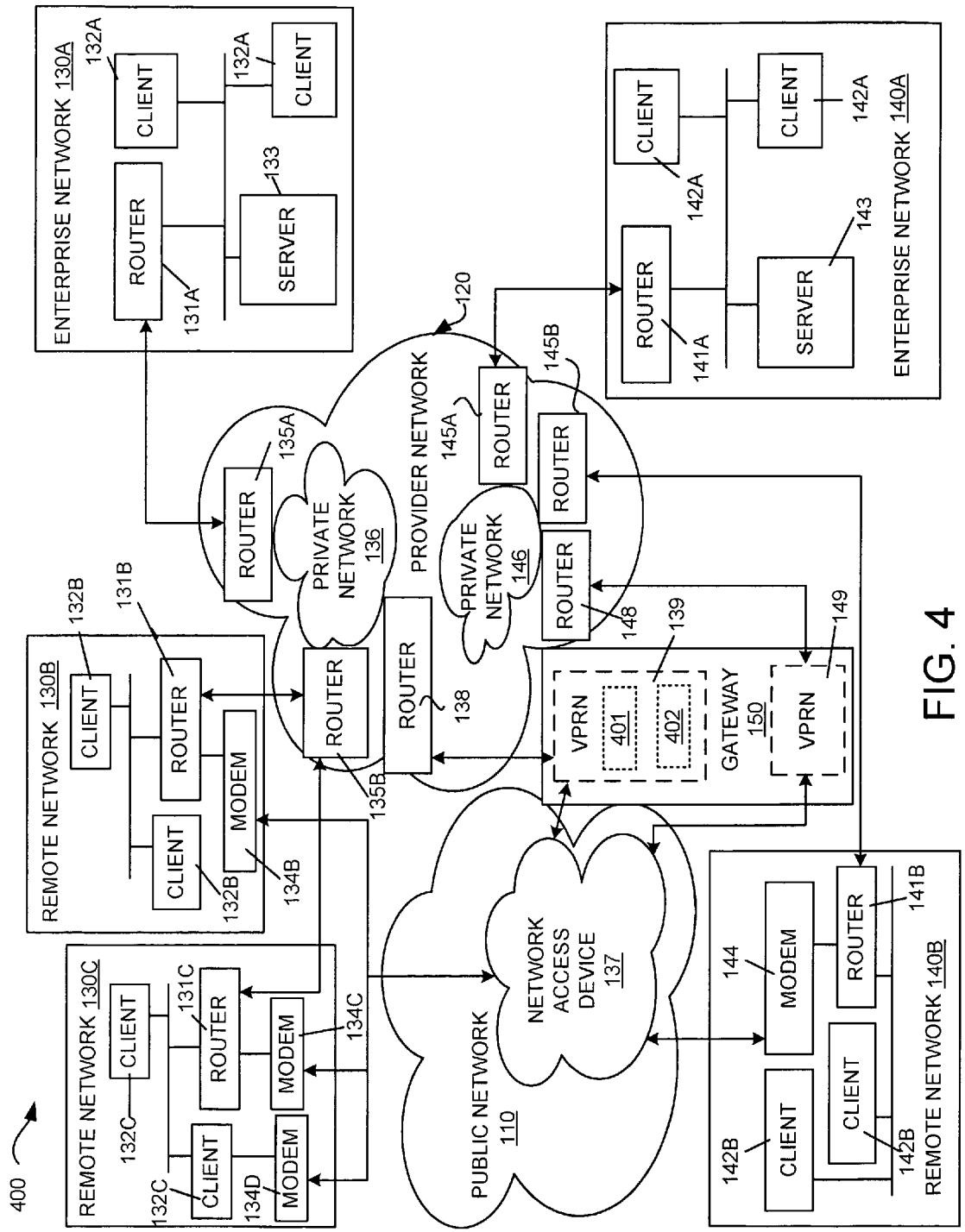
FIG. 4 illustrates exemplary network configurations in which methods and systems consistent with the principles of the invention can be implemented.

FIG. 4 illustrates an exemplary network 400 in which various systems and methods consistent with the principles of the invention may be implemented. In one exemplary implementation, enterprise network 130A may be a privately owned and possibly maintained network. For example, enterprise network 130A may be a company's private network, e.g., a network at a company headquarters. The company may have remote sites shown as remote networks 130B and 130C.

Private network 136 may be a PIP network of the company that is maintained on provider network 120 by a carrier. Remote networks 130B and 130C may have primary connections to private network 136 via lines leased from the carrier providing connections from routers 131B and 131C to router 135B. The link between router 131B and router 135B may be an integrated services digital network (ISDN) connection, for example.

The carrier may provision gateway 150 to create dedicated backup connections from remote networks 130B and 130C to private network 136 via public network 110. For example, VPRN 139 may be associated with enterprise 130A by using a designated domain name, e.g., "enterprise130A.com," which may be stored by gateway 150. A first virtual interface 401 associated with remote network 130B may be established by designating a peer address, e.g., 192.168.10.1, for router 131B, and a local address, e.g., 192.168.10.2, for virtual interface 401, which may be stored by gateway 150. A network address, e.g., 10.10.130.0, may be designated for the network located "behind" router 131B (e.g., remote network 130B), which may be stored by gateway 150. The first virtual interface 401 may be assigned a username, e.g., "network130B@enterprise130A.com." A second virtual interface 402 associated with remote network 130C may be established by designating a peer address, e.g., 192.168.10.3, for router 131C, and a local address, e.g., 192.168.10.4, for virtual interface 402, which may be stored by gateway 150. A network address, e.g., 10.10.140.0, may be designated for the network located behind router 131C (e.g., remote network 130C) and may be stored by gateway 150. The second virtual interface 402 may be assigned a username, e.g., "network130C@enterprise130A.com."

Router 131B may monitor network traffic over the primary link between router 131B and router 135B. When router 131B detects a failure in transmissions over the primary link, router 131B may initiate a dial-up connection through modem 134B to a dial access network, e.g., network access device 137, to transmit a network access request using a PPP connection. The access request may include the username, network130B@enterprise130A.com, such that the access request is routed to VPRN 139, based on the domain name, and activating virtual interface 401. Router 131B is authenticated and a network connection is established via the PPP/L2TP tunnel logically terminated by network access device 137 (i.e., the LAC) and virtual gateway 150 (i.e., the LNS). Network traffic is then fully routable in both directions between private network 136 and/or enterprise network 130A and clients 132B, using network address 10.10.130.0. Gateway 150 may send routing information updating network routes to include the alternate connection using the PPP/L2TP tunnel, using RIP. The alternate connection may be maintained until the primary link becomes available again.

A dedicated PPP/L2TP backup connection may similarly be established for remote network 130C, for example, when the primary link between router 131C and router 135B becomes unavailable, independent of the creation of the backup link for remote network 130B. For example, when router 131C detects a failure in transmissions over the primary link, router 131C may initiate a dial-up connection through modem 134C to the dial access network, e.g., network access device 137, to transmit a network access request using a PPP connection. The access request may include the username, network130C@enterprise130A.com, such that the access request is routed to VPRN 139, based on the domain name, and activating virtual interface 402. Router 131C is authenticated and a network connection is established via the PPP/L2TP tunnel logically terminated by network access device 137 (i.e., the LAC) and virtual gateway 150 (i.e., the LNS). Network traffic is then fully routable in both directions between private network 136 and/or enterprise network 130A and clients 132C, using network address 10.10.140.0. Gateway 150 may send routing information updating network routes to include the alternate connection using the PPP/L2TP tunnel, using RIP. The alternate connection may be maintained until the primary link becomes available again.

In another exemplary implementation, the carrier also maintains private network 146 for a second company. The carrier may provision gateway 150 to create a dedicated backup connection from remote network 140B to private network 146 via public network 110. For example, VPRN 149 may be associated with enterprise network 140A by using a designated domain name, e.g., "enterprise140A.com," which may be stored by gateway 150. A virtual interface (not shown) associated with remote network 140B may be established by designating a peer address, e.g., 192.178.10.1, for router 141B, and a local address, e.g., 192.178.10.2, for the virtual interface, which may be stored by gateway 150. A network address, e.g., 10.10.150.0, may be designated for the network behind router 141B, which may be stored by gateway 150. The virtual interface may be assigned a username, e.g., "network140B@enterprise140A.com."

Router 141B may monitor network traffic over the primary link between router 141B and router 145B. When router 141B detects a failure in transmissions over the primary link, router 141B may initiate a dial-up connection through modem 144 to a dial access network, e.g., network access device 137, to transmit a network access request using a PPP connection. The access request may include the username, network140B@enterprise140A.com, such that the access request is routed to VPRN 149, based on the domain name, and activating the associated virtual interface. Router 141B is authenticated and a network connection is established via the PPP/L2TP tunnel logically terminated by network access device 137 (i.e., the LAC) and virtual gateway 150 (i.e., the LNS). Network traffic is then fully routable in both directions between private network 146 and/or enterprise network 140A and clients 142B, using network address 10.10.150.0. Gateway 150 may send routing information updating network routes to include the alternate connection using the PPP/L2TP tunnel, using RIP. The alternate connection may be maintained until the primary link becomes available again.

Additional connections between other enterprise networks and remote networks may be established in a similar manner. Accordingly, gateway 150 may facilitate communications between any number of dedicated PPP/L2TP tunnels associated with independent networks, and/or establish VPRNs associated with the dedicated PPP/L2TP tunnels.

In another exemplary implementation, a secondary dedicated backup connection may be established for remote network 130C. For example, modem 134D may be connected to a single client 132C, as shown in FIG. 4, such that a PPP connection alternatively may be established from client 132C to gateway 150, substantially as described above.

CONCLUSION

Implementations consistent with principles of the invention provide for a network-based dedicated backup connection that uses a PPP/L2TP tunnel that supports full bidirectional routing. Implementations may provide a centralized VPRN management point in a network to thereby advantageously obviate the need for installation and maintenance of customer premises equipment infrastructure, such as a large number of modem banks and/or ISDN lines. Using a centralized management point also helps to resolve routing issues resulting from primary link failures. Accordingly, dedicated backup systems consistent with principles of the invention provide substantially improved backup connections over typical backup processes.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of operations has been disclosed with regard to FIG. 3, the order of the operations may be varied in other implementations consistent with principles of the invention. Furthermore, non-dependent operations may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. Such logic may include hardware, such as an application specific integrated circuit (ASIC) or a field programmable gate array, software, or a combination of hardware and software. While aspects have been described in terms of processing messages or packets, such aspects may operate upon any type or form of data, including packet data and non-packet data. The term "data unit" may refer to packet or non-packet data.

No element, operation, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   enabling, via a first link in a provider network, communications between a first network and a user device associated with a second network;
   determining whether the first link is unavailable;
   enabling the communications via a second link in the provider network and a public network using a dedicated point-to-point protocol (PPP)/layer 2 tunneling protocol (L2TP) tunnel through at least a portion of the public network, responsive to a determination that the first link is unavailable, where the first link does not traverse the public network;
   enabling, via a third link in the provider network, communications between the first network and a user device associated with a third network;
   enabling, via a fourth link in the provider network and a second dedicated PPP/L2TP tunnel, the communications between the first network and the user device associated with the third network; and
   storing, by a gateway associated with the second and fourth links, a first pair of addresses respectively assigned to the gateway and a router associated with the second network, and a second pair of addresses respectively assigned to the gateway and a router associated with the third network.

2. The method of claim 1, where the enabling communications via the first link comprises:
   receiving data via the router associated with the second network.

3. The method of claim 1, where the enabling communications via the second link comprises:
   receiving data via a modem and the router associated with the second network.

4. The method of claim 1, where the PPP/L2TP tunnel comprises:
   a bidirectional link between the first network and the user device.

5. The method of claim 3, where the enabling communications via the second link comprises:
   establishing a dial-up connection between the modem and a network access device.

6. The method of claim 3, where the determining whether the first link is unavailable includes:
   receiving an indication that the first link is unavailable.

7. The method of claim 3, further comprising:
   storing, by the gateway associated with the second link, a first address associated with the gateway and a second address associated with the router.

8. The method of claim 7, further comprising:
   establishing a virtual private routed network (VPRN) associated with the second network based on the first and second addresses.

9. The method of claim 1, further comprising:
   establishing, a virtual private routed network (VPRN) associated with the second and third networks based on the first and second pairs of addresses.

10. The method of claim 1, further comprising:
    enabling, via a fifth link in the provider network, communications between a third network and a user device associated with a fourth network; and
    enabling, via a sixth link in the provider network and a second dedicated PPP/L2TP tunnel, communications between the third network and the user device associated with the fourth network.

11. The method of claim 10, further comprising:
    storing, by a gateway associated with the second and sixth links, a third pair of addresses respectively assigned to the gateway and a router associated with the second network, and a fourth pair of addresses respectively assigned to the gateway and a router associated with the fourth network.

12. The method of claim 11, further comprising:
    establishing, a first virtual private routed network (VPRN) associated with the second network based on the third pair of addresses; and
    establishing, a second VPRN associated with the fourth network based on the fourth pair of addresses.

* * * * *